United States Patent
Kitayama et al.

[11] Patent Number: 5,609,526
[45] Date of Patent: Mar. 11, 1997

[54] DAMPER DISC ASSEMBLY

[75] Inventors: Koji Kitayama; Hideyuki Imanaka, both of Neyagawa, Japan

[73] Assignee: Daikin Clutch Corporation, Osaka, Japan

[21] Appl. No.: 259,345

[22] Filed: Jun. 14, 1994

Related U.S. Application Data

[63] Continuation of Ser. No. 977,661, Nov. 18, 1992, abandoned.

[30] Foreign Application Priority Data

Nov. 18, 1991 [JP] Japan .................. 3-094316 U

[51] Int. Cl.⁶ .................................................. F16D 3/14
[52] U.S. Cl. .......................................................... 464/68
[58] Field of Search ............................ 464/66, 67, 68, 464/64, 63; 192/106.1, 106.2, 212, 213, 213.2

[56] References Cited

U.S. PATENT DOCUMENTS

| | | | |
|---|---|---|---|
| 4,440,283 | 4/1984 | Nioloux | 464/68 X |
| 4,485,909 | 12/1984 | Gatewood | 464/68 X |
| 4,537,295 | 8/1985 | Fädler et al. | 464/68 X |
| 4,557,702 | 12/1985 | Takeuchi | 464/68 |
| 4,596,535 | 6/1986 | Ooga | 464/68 |
| 4,684,007 | 8/1987 | Maucher | 464/68 X |
| 4,743,217 | 5/1988 | Tojima et al. | 464/68 X |
| 4,787,877 | 11/1988 | Nagao et al. | 192/106.2 X |
| 4,789,053 | 12/1988 | Ficher et al. | 192/106.2 |
| 4,924,990 | 5/1990 | Takeuchi | 192/106.2 |
| 4,944,499 | 7/1990 | Tojima | 464/68 X |
| 5,052,978 | 10/1991 | Hanke | 464/68 X |

FOREIGN PATENT DOCUMENTS 2128715  5/1984  United Kingdom ............. 464/64

*Primary Examiner*—Michael R. Mansen
*Assistant Examiner*—Eileen A. Dunn
*Attorney, Agent, or Firm*—Knobbe, Martents, Olson & Bear

[57] ABSTRACT

A damper disc assembly comprises a radially flanged hub, connectable to an output shaft, flanked by lateral subplates, and surrounded by an input rotation member; a first torsional vibration damping mechanism; a second torsional vibration damping mechanism; and an action limiting member. The first torsional vibration damping mechanism elastically connects the hub and the lateral subplates and includes a first, low-rigidity elastic member and a first hysteric damping mechanism developing lesser hysteresis. The second torsional vibration damping mechanism, also elastically connecting the lateral subplates and the input rotation member, includes second and third elastic members more rigid than the first elastic member, and a second hysteretic damping mechanism developing greater hysteresis. The action limiter restricts the action or the elastic members such that only one of the second and third of these operates in the effective range of the second torsional vibration damping mechanism, thereby providing torsional vibration damping under operational characteristics in which the assembly is in a medium-rigidity phase meanwhile effecting the greater hysteresis.

12 Claims, 7 Drawing Sheets

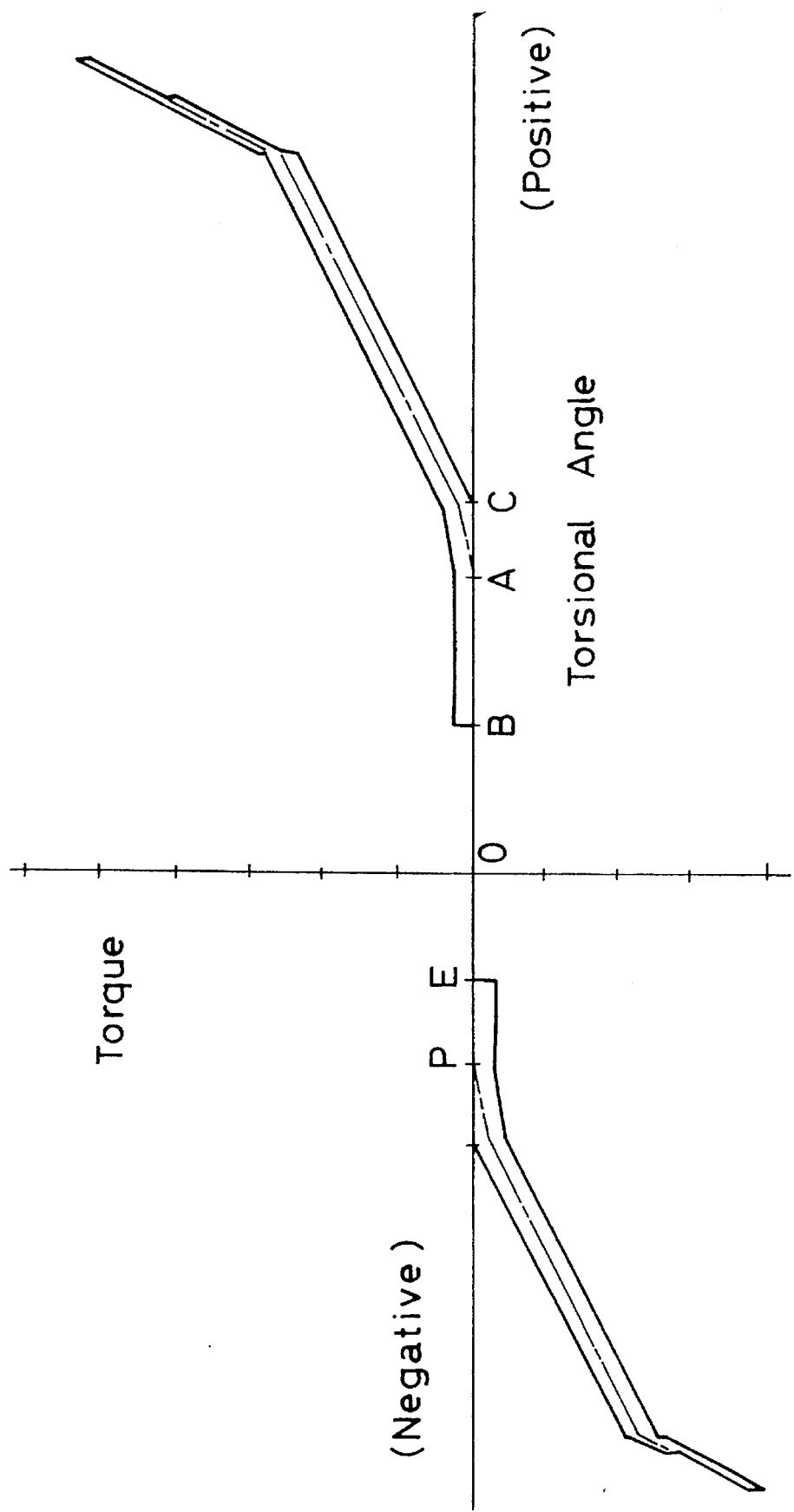

DAMPER DISC ASSEMBLY

This application is a continuation of application Ser. No. 07/977,661, filed Nov. 18, 1992, now abandoned.

BACKGROUND OF THE INVENTION

The present Invention relates to a damper disc assembly employable in the clutch disc assembly of heavy-duty vehicles.

The torsional damping characteristics (torsional angle versus torque) of damper disc assemblies of this type are such that in effect there is a first, low-rigidity/low torsional hysteretic damping stage and a second, high-rigidity/high torsional hysteretic damping stage. Thus torsional vibration under low loads when the engine is idling is damped through the first response stage; under high loads torsional vibration Is damped through the second response stage of the damper disc assembly.

Under the functional characteristics of the assembly in torsional damping there is a point where the first stage shifts to the second stage, at which the assembly rigidity and the torsional hysteretic damping change rapidly. Under certain vehicle operation conditions in particular, the damper disc assembly may operate in the range including the transition point at which assembly rigidity and torsional hysteretic damping change sharply. Torsional vibration is therein not damped smoothly, giving rise to high-level growling noise due to gearbacklash in the transmission.

A PTO (power takeoff) mechanism equipped with both power take-off as well as drive damper disc assemblies for driving is provided in one type of heavy-duty vehicle. Therein, the power take-off damper disc assembly often is activated in the range of the abrupt stage-shifting point, giving rise to increased noise due to gear backlash and so on.

SUMMARY OF THE INVENTION

It is an object of the present invention to effect smooth transition between the torsional damping response stages so as to decrease noises due to transmission gear backlash and the like.

A damper disc assembly according to the present invention comprises a hub, lateral subplates, an input rotation member, a first torsional-vibration damping mechanism, a second torsional-vibration damping mechanism and an action limiting member.

The hub is radially flanged and is connectable to an output shaft. The input rotation member is mounted around the hub and can turn relative to it. The first torsional-vibration damping mechanism connects the hub and the lateral subplates elastically and includes a first, low-rigidity elastic member and a first hysteretic torsional damper developing a lesser hysteresis. The second torsional-vibration damping mechanism also elastically connects the lateral subplates and the input rotation member and includes second and third elastic members, which are more rigid than the first elastic member, and a second hysteretic-torsional damper developing a hysteresis greater than that of the first. The action limiting member restricts the action of the elastic members such that only one of the second and third elastic members operates in the effective range of the second torsional-vibration damping mechanism, thereby providing torsional vibration damping under operational characteristics in which the assembly is in a medium-rigidity phase meanwhile effecting the greater hysteretic damping response.

Under low load, the first elastic members in this damper disc assembly, having the lowest rigidity, are compressed, and the first hysteretic torsional damper is functional. The characteristics of the torsional vibration damping therein are effected through low assembly rigidity and the lesser hysteretic damping response. Meanwhile, under medium load, the action of either the second or third elastic member takes effect, restricted to one or the other of these by the action limiting member. The one of the elastic members and the second hysteretic torsional damper provide torsional vibration damping under characteristics In which the assembly is in a high-rigidity phase meanwhile effecting the greater hysteretic damping response. Accordingly, abrupt change in the assembly rigidity and in the level of hysteretic torsional damping over the transitional range is averted, smoothing the torsional damping characteristics and thereby reducing noise due to such causes as gear backlash in the transmission.

The foregoing and other objects, aspects and advantages of the present invention will become more apparent from the following detailed description, when taken in conjunction with the accompanying drawings.

BRIEF DESCRIPTION OF THE DRAWINGS

FIG. 7 is a diagram corresponding to FIG. 5 of torsional characteristics of this embodiment.

DESCRIPTION OF THE PREFERRED EMBODIMENTS

Figure 1:
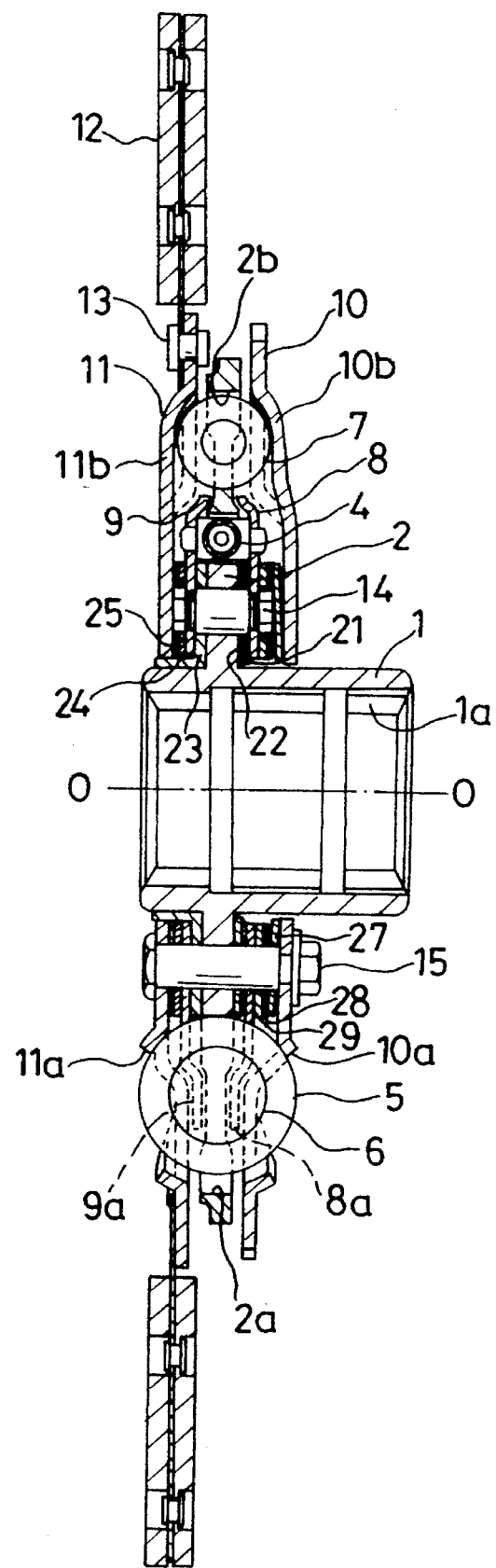
FIG. 1 is a split-depth sectional view of an embodiment of the present invention, taken along the line I—I of FIG. 3.
Figure 2:
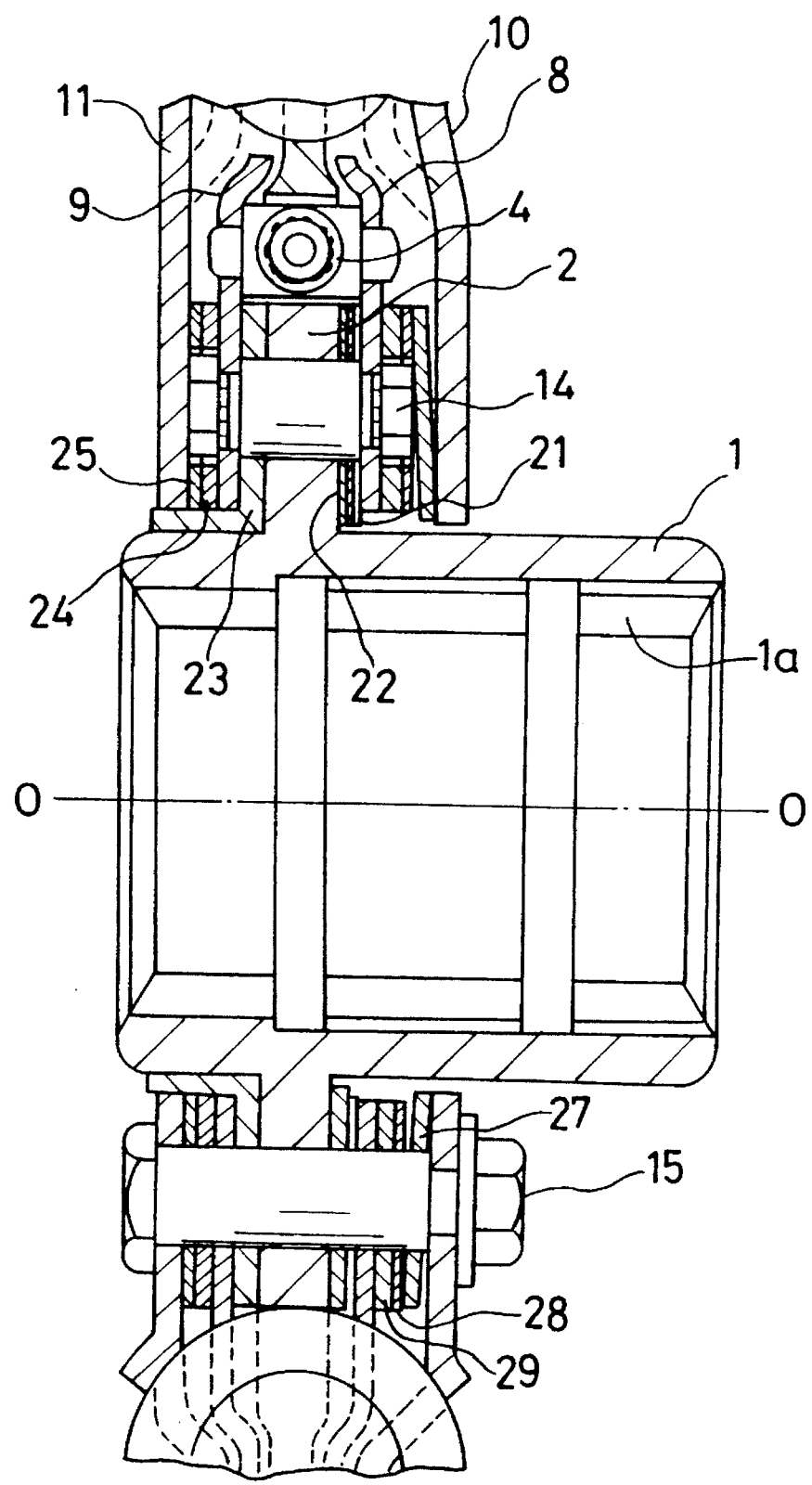
FIG. 2 is an enlarged partial view of FIG. 1.
Figure 3:
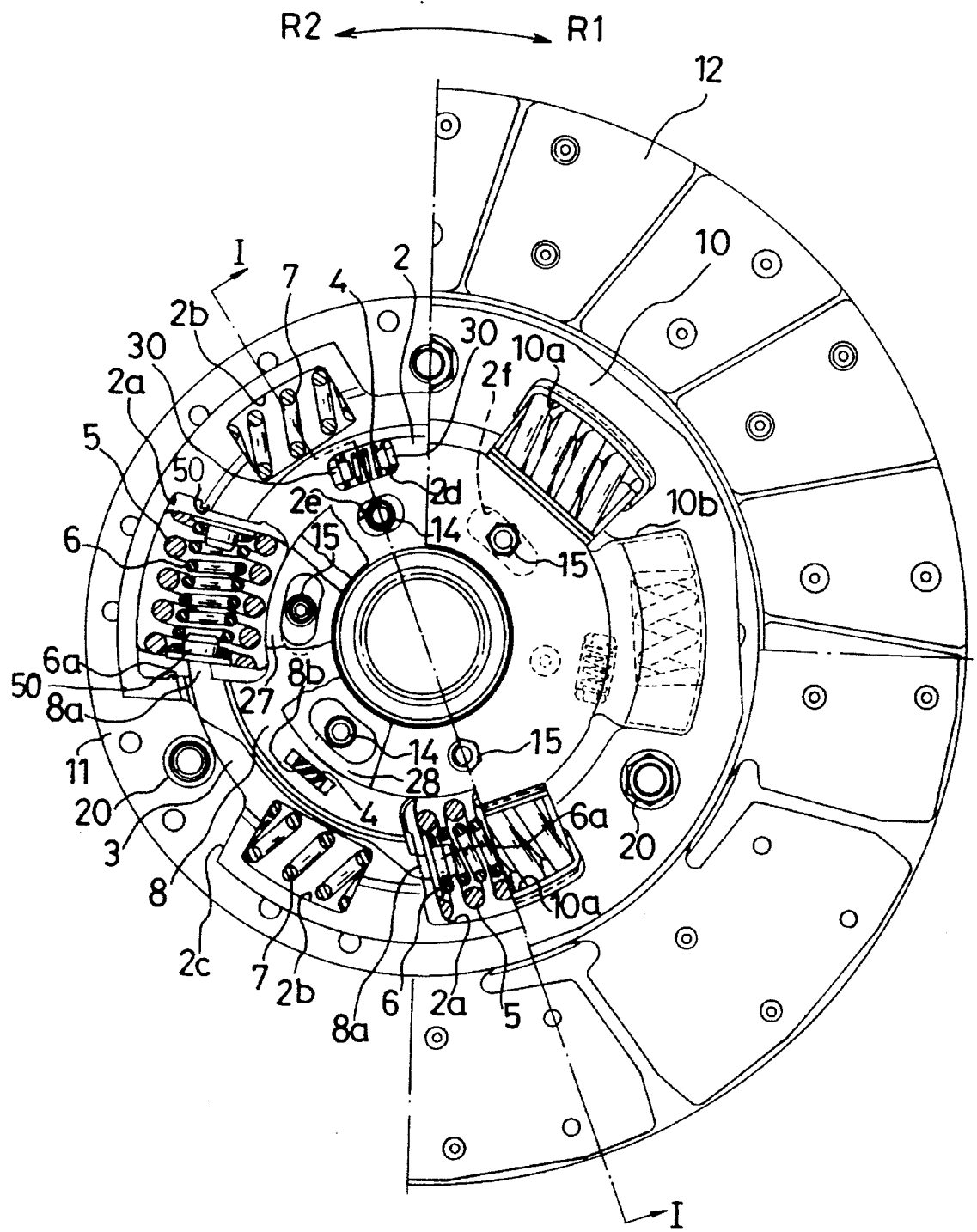
FIG. 3 is an elevational view of the damper disc assembly, partially cut away.

FIGS. 1 through 3 show a damper disc assembly according to an embodiment of the present invention.

With reference to the figures, a flanged hub 1 is shown located in the center of the damper disc assembly. The hub 1 is provided with internal splines 1a for splined engagement with the main drive shaft of a transmission (not shown). The flange 2 is formed integrally around the periphery of the hub 1. Provided adjacent the rim of the flange 2 are three first windows 2a, between which are circumferentially interposed three second windows 2b. A notch 2c opening radially outward is formed between adjacent pairs of first windows 2a and second windows 2b. The flange 2 is also provided with three circumferentially equidistant third windows 2d, radially Inward of the windows 2a and 2b, for containing an inner coil spring 4 (first elastic member). A pair of spring seats 30 are located between both ends of the inner coil spring 4 and adjacent end walls of the window 2d. Further, radially inward of the third windows 2d, the flange 2 is provided with holes 2e situated in axial correspondence with first subpins 14 (described later), between which are interposed slots 2f situated in axial correspondence with second subpins 15 (described later), the holes 2f being circumferentially longer than the holes 2e.

The first windows 2a of the flange 2 are formed larger than the second windows 2b and each contain a large spring 5 (second elastic member) encompassing a small spring 6 (third elastic member) of smaller-gauge wire and having shorter outside diameter. The rigidity of the small spring 6 is between those of the inner coil spring 4 and the large spring 5. A pair of spring seats 6a are disposed at both ends of the small springs 6. A high-rigidity coil spring 7 is contained in each second window 2b.

Figure 4:
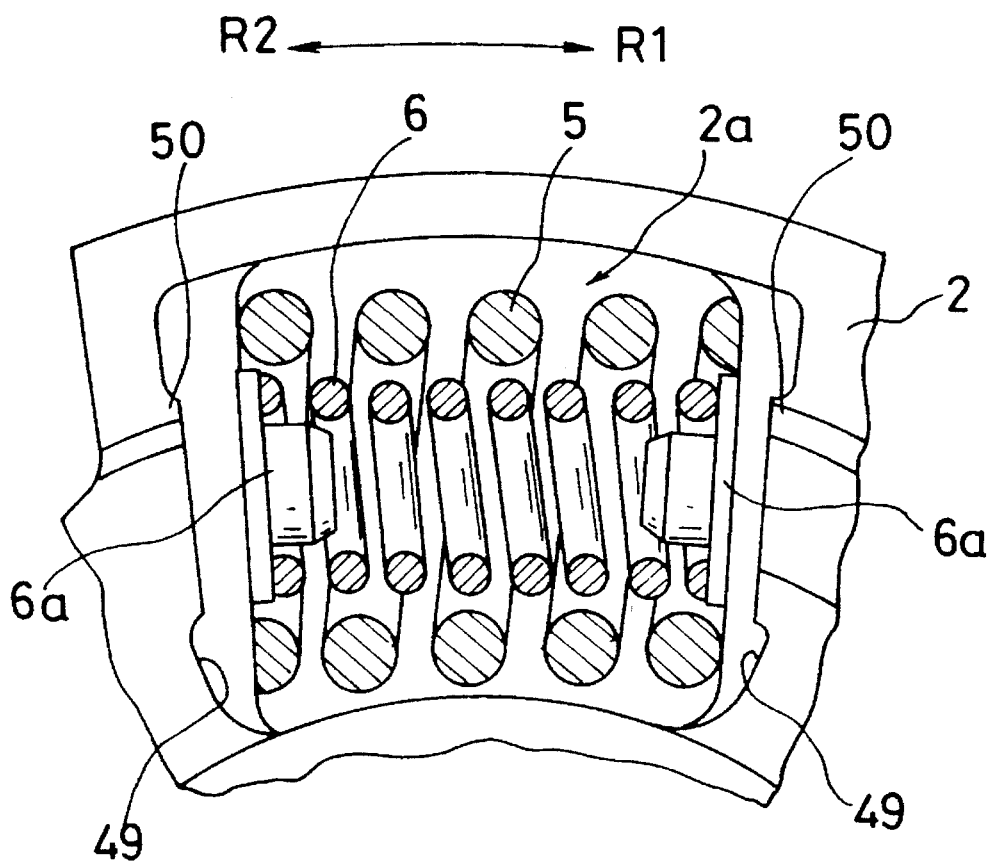
FIG. 4 is an enlarged partial view of FIG. 3.

As shown enlargedly in FIG. 4, protuberances 50 extending toward each other are formed at the circumferentially opposed edges 49 of each first window 2a. The protuberances 50 are formed centrally along either edge and are of length approximately equal to the outside diameter of the spring seats 6a.

Subplates 8 and 9 are disposed on either side axially of the flange 2. The subplates 8 and 9 are discs twistably fitted onto the hub 1, and their rims extend radially outward and converge toward corresponding surfaces of the outer peripheral margin of the flange 2. The subplates 8 and 9 have claws 8a and 9a respectively, which maintain contact with the spring seats 6a of the small coil springs 6. The claws 8a and 9a are formed along the rims of the subplates 8 and 9 extending circumferentially such that a given spacing is maintained between the adjacent containing portion of the subplates 8 and 9, and the large springs 5. The subplates 8 and 9 are formed with windows 8b and 9b axially corresponding to the third windows 2d of the flange 2 containing the inner coil springs 4, the windows 8b retaining the inner coil springs 4, which Joins the subplates 8 and 9 with the flange 2 in circumferentially elastic connection. First subpins 14 are provided between the radially inward margins of the pair of subplates 8 and 9. The first subpins 14 are selected to determine the axial spacing between the subplates 8 and 9.

The first subpins 14, as is apparent in FIG. 3, are received into the holes 2e of the flange 2, wherein abutment of the first subpins 14 against either of the circumferentially opposed walls of the holes 2e restricts the torsional angle of the flange 2 relative to the subplates 8 and 9.

A retaining plate 10 and a clutch plate 11 as an input rotation member are located on the either side axially of the subplates 8 and 9. The plates 10 and 11 are discs twistably fitted onto the hub 1. Friction facings 12 are fixed to the rim of the clutch plate 11 through rivets 13. The retaining plate 10 and the clutch plate 11 are formed with three windows 10a and three windows 11a respectively, axially corresponding to the first windows 2a of the flange 2. The windows 10a and 11a axially support the large springs 5 and the small springs 6 and their edges abut with the adjacent ends of the large springs 5 and the spring seats 6a. The retaining plate 10 and the clutch plate 11 are connected to each other at their hubward margins through the second subpins 15, and at their rims through stop pins 20 (FIG. 3). The second subpins 15, as shown in FIG. 3, penetrate the holes 2f of the flange 2. The stop pins 20 are received into the notches 2c formed along the rim of the flange 2, wherein abutment of the stop pins 20 against either circumferentially opposed wall of the notch 2c restricts the torsional angle of the retaining plate 10 and the clutch plate 11, relative to the flange 2.

As shown in FIG. 1 and FIG. 3, the retaining plate 10 and the clutch plate 11 are formed with spring-containing portions 10b and 11b respectively, axially corresponding to the second windows 2b of the flange 2. The spring-containing portions 10b and 11b are circumferentially longer than the high-rigidity springs 7 in the second windows 2b, wherein they maintain spacings between themselves and both ends of the high-rigidity springs 7.

Disposed between the subplate 8 and the hubward margin of the flange 2, as shown enlargedly in FIG. 2, are a wave spring 21 and a friction washer 22 in this order from the subplate 8. A bush 23 is disposed between the subplate 9 and the hubward margin of the flange 2. The wave spring 21, the friction washer 22 and the bush 23 compose a first hysteretic torsional-damping mechanism. Each component of this mechanism is formed with respective holes through which the first subpins 14 and the second subpins 15 are received. The holes into which the second subpins 15 are received are circumferentially longer than the holes into which the first subpins 14 are received. In the foregoing structure, the subplates 8 and 9 are pressed against the flange 2 through the friction washer 22 and the bush 23 by the pressure of the wave spring 21, wherein a lesser, first-stage torsional hysteresis develops when the subplates 8 and 9 rotate relative to the flange 2.

Provided between the clutch plate 11 and the hubward margin of the subplate 9 are a friction washer 24 and a friction plate 25 in that order from the subplate 9. The friction washer 24 and the friction plate 25 are bonded together. Disposed between the retaining plate 10 and the hubward margin of the subplate 8 are a cone spring 27, a friction plate 28 and a friction washer 29 in that order from the retaining plate 10. These components, composing a second hysteretic torsional-damping mechanism, are discs formed with circumferentially extending holes through which the second subpins 15 are received. The friction plate 28 and the friction washer 29 are bonded to each other. In the foregoing structure, by virtue of pressure of the cone spring 27, the clutch plate 11 and the retaining plate 10 are pressed against the subplate 8 and 9 through the friction washers 24 and 29, wherein a greater, second-stage torsional hysteresis develops when the clutch plate 11 and the retaining plate 10 rotate relative to the subplates 8 and 9.

Next, torsional vibration damping during torque transmission will be explained.

When torque is transmitted to the friction facings 12, the clutch plate 11 and the retaining plate 10 are rotated. The torque transmitted to the plates 10 and 11 is, in turn, transmitted to the hub 1 through the springs 5 and 6, the subplates 8 and 9, the inner coil springs 4 and so on. The torque is transmitted from the hub 1 to the transmission through the main drive shaft (neither shown).

Torque fluctuations arising in the engine are transmitted to the damper disc assembly as torsional vibration. Torsional vibration under low loads is damped by frictional drag developed in the first hysteretic torsional-damping mechanism. Torsional vibration under high loads is damped by frictional drag developed in the second hysteretic torsional-damping mechanism.

Figure 5:
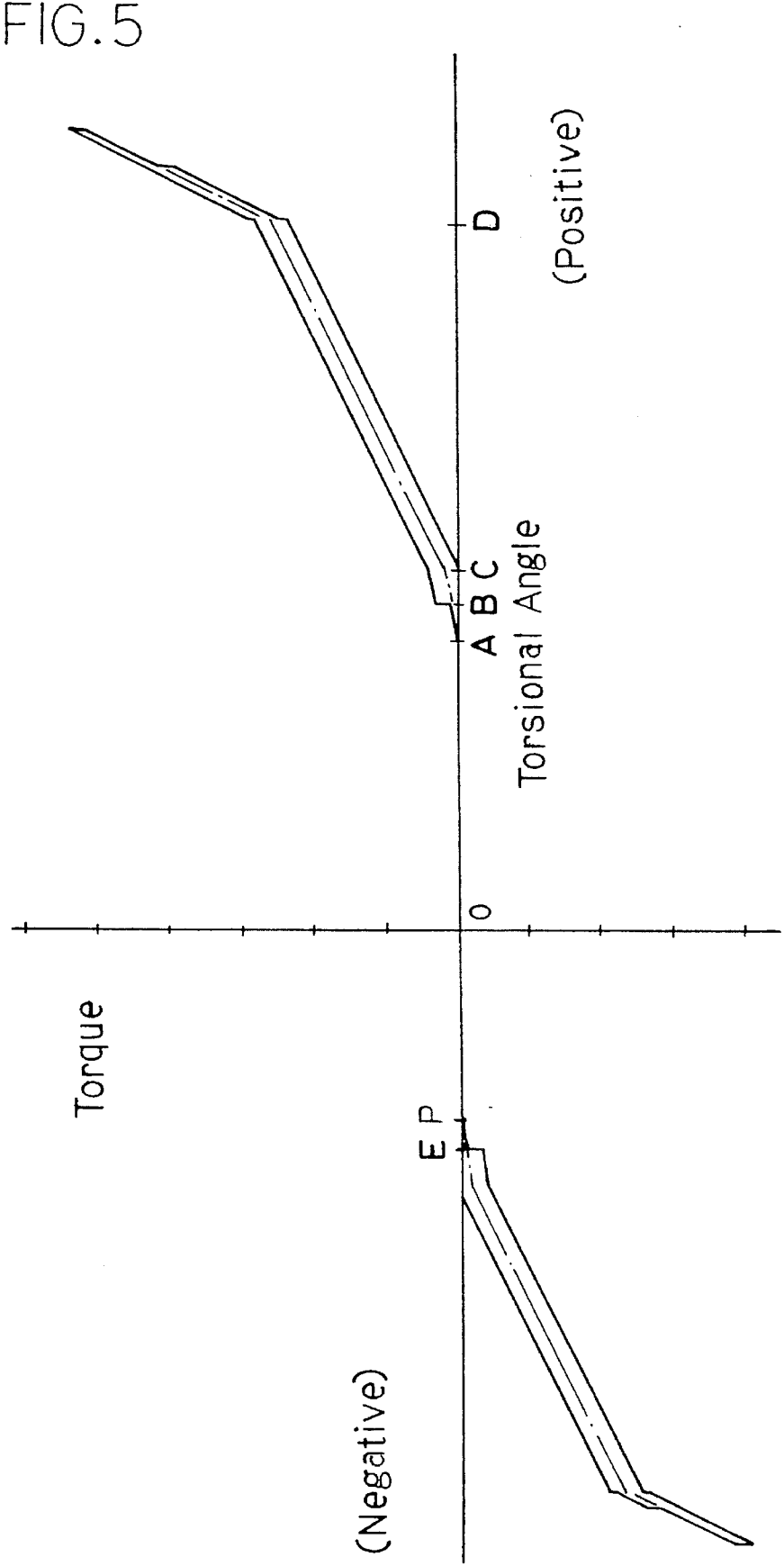
FIG. 5 is a diagram of torsional characteristics of the damper disc assembly, graphing torsional angle versus torque response.

Next, referring to the torsional characteristics diagram shown in FIG. 5, change in assembly torsional rigidity and torsional hysteresis according to changes in torsional angle of the clutch plate 10 relative to the hub 1 will be explained.

First, change in the torsional rigidity of the assembly will be explained.

When the clutch plate 11 twists relative to the hub 1 in the positive rotation direction R1 indicated in FIG. 3, the inner coil springs 4, the lowest-rigidity members, are compressed. When the torsional angle reaches point A in FIG. 5, the spring seats 6a come into abutment against corresponding protuberances 50 of the flange 2. If the clutch plate 11 twists further, the small springs 6 are compressed by the spring seats 6a. Meanwhile, the subplates 8 and 9 will be twisted with the clutch plate 11 by frictional drag through the small spring 6 compression. Accordingly, after the point A, a mid-level rigidity operational phase results, wherein torsional rigidity of the small springs 6 is added to the low-torsional rigidity of the inner coil springs 4.

Wherein the torsional angle reaches point B, the first subpins 14 connected to the subplates 8 and 9 abut against the positive rotation-ward edges of the holes 2e of the flange 2. Thereupon, the subplates 8 and 9 and the flange 2 begin to turn in union, wherein medium torsional rigidity of the assembly under the torsional rigidity of the small springs 6 arises.

If the small springs 6 are further compressed the torsional angle reaches point C, wherein the large springs 5 abut against the edges 49 of the windows 2a of the flange 2. Upon abutment, the large springs 5 and the small springs 6 are in simultaneous compression, wherein high rigidity results by means of the two kinds of springs.

At point D of the extent of a torsional angle, the spring-containing portions 10b of the retaining plate 10 and the spring containing portions 11b of the clutch plate 11 abut against and compress the high-rigidity springs 7. The high-rigidity springs 7 then are compressed until at last the stop pins 20 abut against the circumferentially positive edges of the notches 2c formed in the flange rim, whereby the torsional movement of the clutch plate 11 relative to the hub 1 is ended.

Next, change in the torsional hysteresis will be detailed.

The first stage torsional hysteresis (0-B in FIG. 5) is small, and develops in the twisting of the subplates 8 and 9 relative to the flange 2 from the first hysteretic torsional-damping mechanism comprising the wave spring 21, the friction washer 22 and the bush 23, until the subplates 8 and 9 and the flange 2 begin to turn in union at point B. Under low operational loads, the stage of low rigidity and lesser torsional hysteresis shown from point 0 to point A in FIG. 5, or from point 0 to point P in the case of the negative rotation R2 direction, results.

After reaching point B, the retaining plate 10 and clutch plate 11 begin to twist relative to the subplates 8 and 9 wherein the friction washer 29 and the friction washer 24 counterslide. The second-stage, greater torsional hysteresis develops according to the second hysteretic torsional-damping mechanism comprising the cone spring 27 and the friction washers 24 and 29. That is during the medium-rigidity phase of the assembly wherein the small springs 6 are compressed, the lesser torsional hysteresis stage is shifted to the greater torsional hysteresis stage.

In this embodiment, since the protuberances 50 are provided in the windows 2a of the flange 2, the small springs 6 come into abutment with the flange 2 prior to the large springs 5. Consequently, a medium-rigidity, greater torsional hysteresis stage (B-C) is effected between the low-rigidity, lesser torsional hysteresis stage (0-A), and the high-rigidity, greater torsional hysteresis stage (beyond point C). Smooth transitions among the resulting overall torsional characteristics of the assembly reduce noise due to such causes as gear backlash in the transmission when the vehicle is driven at lower speeds or when its PTO mechanism is put into operation.

Other Embodiments

In the aforedescribed embodiment, the small springs 6 have enough rigidity to return to the neutral position by overcoming frictional resistance corresponding to the second stage torsional hysteresis. The rigidity of the small springs 6 may be designed weaker than the assembly rigidity under the second stage torsional hysteresis, such that the small springs 6 do not fully return the subplates 8 and 9 to the neutral position.

Figure 6:
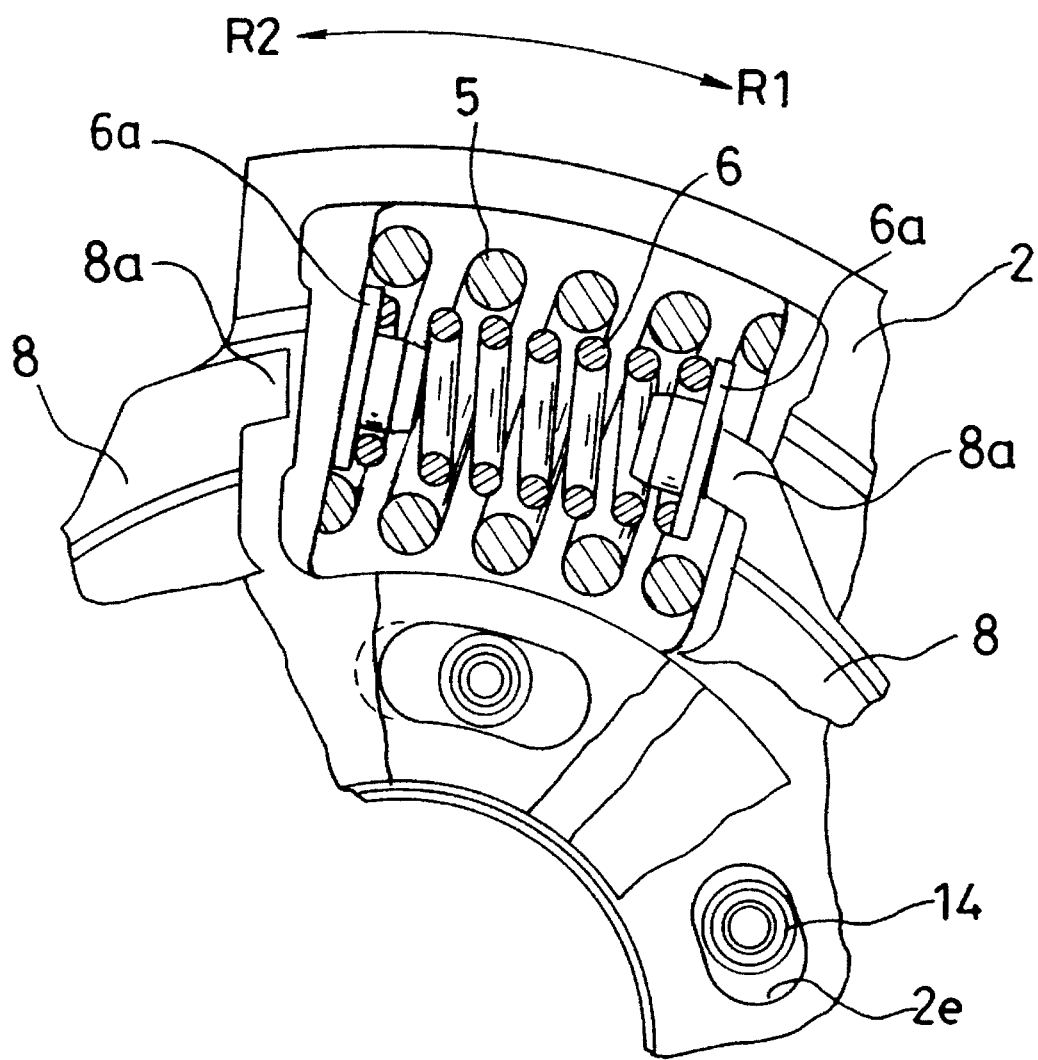
FIG. 6 is a view of another embodiment, corresponding to FIG. 4.

FIG. 6 shows the relative locations of each component when the clutch plate 11 and retaining plate 10 have returned to the neutral position after being twisted in the negative rotation direction R2. The subplates 8 and 9 have not returned to the neutral position and but remain twisted at a certain angle in the negative rotation direction R2 due to the lower rigidity of the small springs 6. Likewise, the first subpins 14 are rotationally angled toward the holes 2e from the neutral position in the negative rotation direction R2.

If torque in the negative rotation direction R2 is applied to the clutch plate 11 in the FIG. 6 state, the clutch plate 11 and the retaining plate 10 cause the subplates 8 and 9 to twist by virtue of the frictional drag of the second hysteretic torsional-damping mechanism. The first subpins 14 abut against the ends of the holes 2e earlier than in the foregoing embodiment by the certain angle. Consequently, as shown in FIG. 7, the second stage torsional hysteresis in the negative rotation direction R2 develops earlier than in the previous embodiment.

The relative locations of the components when the clutch plate 11 has returned to the neutral position after being twisted in the positive rotation direction R1 is reverse to FIG. 6. As a result, as shown in FIG. 7, the second stage torsional hysteresis in the positive rotation direction also develops earlier than in the case of the abovedescribed embodiment.

Accordingly, the second stage torsional hysteresis develops earlier and its entire range of response increases. Wherein torsional vibration occurs in only one of the positive or negative second hysteresis stages, the damper disc does not take effect in the operational range which includes the point at which rigidity shifts abruptly from the first stage to the second stage. When torsional vibration occurs in one or the other of the positive and the negative torsioning phases in low-load ranges such as during the operation of a PTO mechanism, noise and low-speed growling are decreased.

In the case wherein the damper disc assembly is operative in both the positive and negative rotation direction through torsional angles corresponding to the first hysteresis stage, the rotationally angled first subpins 14 are returned to the neutral position by the flange 2 though the rigidity of the small springs 6 is designed to be lower than that corresponding to the lesser torsional hysteresis. Accordingly, the points B and E where the positive/negative stages begin, corresponding to those of FIG. 5, are at the same point as in the previous embodiment, thereby decreasing growling noises at idle.

As described in the foregoing, by changing the rigidity of the small springs 6 and the frictional drag value of the second stage torsional hysteresis. The points at which the second stage torsional hysteresis develops can be varied to suit circumstances.

Various details of the invention may be changed without departing from its spirit nor scope. Furthermore, the foregoing description of the embodiments according to the present invention are provided for the purpose of illustration only, and not for the purpose of limiting the invention as defined by the appending claims and their equivalents.

What is claimed is:

1. A damper disc assembly comprising:

a hub connectable to an output shaft, having a radially extending flange, formed with at least one circumferentially extending first window, at least one circumferentially extending second window and at least one circumferentially extending third window;

at least one lateral plate member disposed adjacent to said flange for limited rotary displacement therebetween, said lateral plate member having at least one pair of circumferentially extending claws and at least one circumferentially extending plate window;

an input rotation member disposed about said hub for limited rotary displacement with respect to said lateral plate member and limited rotary displacement with respect to said flange greater than the displacement of said lateral plate member with respect to said flange, said input rotation member having at least one circumferentially extending input member window;

a first spring member disposed in said third window and said plate window elastically connecting said flange and said lateral plate member to absorb vibration in response to relative displacement therebetween;

second and third co-axial spring members disposed within said first window and said input member window, and between said pair of claws elastically connecting said lateral plate member and said input rotation member, each of said second and third co-axial spring members having a rigidity greater than that of said first spring member, the rigidity of said second spring member being smaller than that of said third spring member, said claws on said lateral plate member being configured to compress said second spring member in response to relative rotation between said hub and said lateral plate member;

said first window formed with at least one circumferentially protruding protuberance contactable with said second spring member in response to relative displacement of said input rotation member and said flange;

a first friction member disposed between said hub and said lateral plate member which creates friction in response to relative displacement therebetween;

a second friction member disposed between said lateral plate member and said input rotation member which creates friction in response to relative displacement therebetween, which develops greater friction than that of said first friction member;

wherein only said second spring member being compressible in a first displacement range and both said second and third spring members being compressible in a second displacement range in response to relative displacement between both said lateral plate member relative to said hub and said input rotation member relative to said lateral plate member.

2. A damper disc assembly as set forth in claim 1 further comprising:

a pin fixed to said lateral plate member and extending through an arcuate aperture formed in said flange thus limiting relative displacement of said lateral plate member with respect to said flange to said first displacement range.

3. A damper disc assembly as set forth in claim 2 further comprising:

a second pin fixed to said input rotation member and extending through a second arcuate aperture formed in said flange thus limiting relative displacement of said input rotation member with respect to said flange to said second displacement range greater than said first displacement range.

4. A damper disc assembly as set forth in claim 3 wherein said first friction member dampens vibration in said first displacement range and said second friction member dampens vibration in said second displacement range.

5. A damper disc assembly as set forth in claim 1 further comprising:

a fourth spring member disposed within said second window and a spring retaining portion formed in said input rotation member, said fourth spring member having a rigidity greater than said first, second and third spring members and which dampens vibration in response to displacement of said input rotation member with respect to said flange.

6. A damper disc assembly as set forth in claim 5 further comprising:

a pin fixed to said lateral plate member and extending through an arcuate aperture formed in said flange thus limiting relative displacement of said lateral plate member with respect to said flange to said first displacement range.

7. A damper disc assembly as set forth in claim 6 further comprising:

a second pin fixed to said input rotation member and extending through a second arcuate aperture formed in said flange thus limiting relative displacement of said input rotation member with respect to said flange to said second displacement range greater than said first displacement range.

8. A damper disc assembly as set forth in claim 7 wherein said first friction member dampens vibration in said first displacement range and said second friction member dampens vibration in said second displacement range.

9. A damper disc assembly as set forth in claim 8 wherein said first spring member dampens vibration in a first portion of said first displacement range and one of said second and third spring members dampens vibration in a second portion of said first displacement range.

10. A damper disc assembly as set forth in claim 9 wherein one of said second or third spring members dampen vibration in a first portion of said second displacement range and both second and third spring members dampen vibration in a second portion of said second displacement range.

11. A damper disc assembly as set forth in claim 10 wherein said fourth spring member dampens vibration in a third portion of said second vibration range.

12. A damper disc assembly comprising:

a hub connectable to an output shaft, having a radially extending flange, formed with at least one circumferentially extending first window, at least one circumferentially extending second window and at least one circumferentially extending third window;

at least one lateral-plate member disposed adjacent to said flange for limited rotary displacement therebetween, said lateral plate member having at least one pair of circumferentially extending claws and at least one circumferentially extending plate window;

an input rotation member disposed about said hub for limited rotary displacement with respect to said lateral plate member and independent limited rotary displacement with respect to said flange, said input rotation member having at least one circumferentially extending input member window;

a first spring member disposed in said third window and said plate window elastically connecting said hub and said lateral plate member to absorb vibration in response to relative displacement therebetween;

a first friction member disposed between said hub and said lateral plate member which creates friction in response to relative displacement therebetween;

second and third co-axial spring members disposed within said window and said input member window, and between said pair of claws elastically connecting said lateral plate member and said input rotation member, each of said second and third co-axial spring members having a rigidity greater than that of said first spring member, the rigidity of said second spring member being smaller than that of said third spring member, said claws on said lateral plate member being configured to compress said second spring member in response to relative rotation between said hub and said lateral member;

a second friction member disposed between said input rotation member and said lateral plate member which creates friction in response to relative displacement therebetween, which develops greater friction than that of said first friction member;

said first window formed with at least one circumferentially protruding protuberance contactable with said second spring member in response to relative displacement of said input rotation member and said flange; and a fourth spring member disposed within said second window and a spring retaining portion formed in said input rotation member, said fourth spring member having a rigidity greater than said first, second and third spring members and which dampens vibration in response to displacement of said input rotation member and said flange greater than the displacement necessary for dampening by said first, second and third spring members.

\* \* \* \* \*